(12) United States Patent
Petruzzo

(10) Patent No.: US 9,019,703 B2
(45) Date of Patent: Apr. 28, 2015

(54) MODULAR RE-CONFIGURABLE COMPUTERS AND STORAGE SYSTEMS

(75) Inventor: Stephen E. Petruzzo, Great Falls, VA (US)

(73) Assignee: GreenTec-USA, Inc., Reston, VA (US)

( * ) Notice: Subject to any disclaimer, the term of this patent is extended or adjusted under 35 U.S.C. 154(b) by 412 days.

(21) Appl. No.: 13/310,035

(22) Filed: Dec. 2, 2011

(65) Prior Publication Data

US 2012/0075795 A1    Mar. 29, 2012

Related U.S. Application Data

(63) Continuation-in-part of application No. PCT/US2010/037143, filed on Jun. 2, 2010.

(60) Provisional application No. 61/183,426, filed on Jun. 2, 2009.

(51) Int. Cl.
*H05K 7/20* (2006.01)
*G06F 1/20* (2006.01)
*G06F 1/18* (2006.01)

(52) U.S. Cl.
CPC ............ *G06F 1/20* (2013.01); *Y10T 29/49826* (2015.01); *Y10T 29/4973* (2015.01); *G06F 1/181* (2013.01)

(58) Field of Classification Search
USPC .............. 361/679.02, 679.46–679.54, 679.6, 361/688–692, 694–695, 724–727
See application file for complete search history.

(56) References Cited

U.S. PATENT DOCUMENTS

| 3,751,127 | A | * | 8/1973 | Black et al. ................. 312/111 |
| 5,123,478 | A |   | 6/1992 | Hosaka |
| 5,227,957 | A | * | 7/1993 | Deters ..................... 361/679.32 |
| 5,482,113 | A |   | 1/1996 | Agonafer et al. |
| 5,602,721 | A | * | 2/1997 | Slade et al. ................. 361/727 |
| 5,737,189 | A | * | 4/1998 | Kammersgard et al. ...... 361/726 |
| 5,754,396 | A | * | 5/1998 | Felcman et al. ........... 361/679.6 |
| 5,909,357 | A | * | 6/1999 | Orr ......................... 361/679.46 |
| 6,018,456 | A | * | 1/2000 | Young et al. .............. 361/679.4 |
| 6,038,126 | A | * | 3/2000 | Weng ..................... 361/679.01 |

(Continued)

FOREIGN PATENT DOCUMENTS

| JP | 2006164040 A | 6/2006 |
| JP | 2009032068 A | 2/2009 |

(Continued)

OTHER PUBLICATIONS

Bean, John, et al., "Energy Efficient Cooling for Data Centers: A Close-Coupled Row Solution," ASHRAE Journal, Oct. 2008, White Paper #137.

(Continued)

*Primary Examiner* — Adrian S Wilson
(74) *Attorney, Agent, or Firm* — Cahn & Samuels, LLP

(57) ABSTRACT

In at least one embodiment, the invention includes a modular re-configurable computer and storage system and method of configuring the system. The system includes a chassis having a plurality of slots for blocks that in at least one embodiment include processor blocks, storage blocks, power blocks, communications blocks, cooling blocks, application service blocks such as cloud blocks, and special-purpose blocks. In a further embodiment, the chassis includes at least one wiring harness with a plurality of connection points for any blocks present in the chassis to facilitate communication, power, and user interaction.

20 Claims, 9 Drawing Sheets

(56) References Cited

U.S. PATENT DOCUMENTS

| | | | |
|---|---|---|---|
| 6,115,242 A * | 9/2000 | Lambrecht | 361/788 |
| 6,188,573 B1 * | 2/2001 | Urita | 361/679.48 |
| 6,272,573 B1 * | 8/2001 | Coale et al. | 710/100 |
| 6,445,579 B1 * | 9/2002 | Singleton, Jr. | 361/679.4 |
| 6,469,901 B1 * | 10/2002 | Costner | 361/730 |
| 6,507,882 B1 * | 1/2003 | Golka et al. | 710/302 |
| 6,661,648 B2 * | 12/2003 | Dayley | 361/679.6 |
| 6,698,851 B1 * | 3/2004 | Ludl | 312/108 |
| 6,714,412 B1 | 3/2004 | Chu et al. | |
| 6,829,147 B2 * | 12/2004 | Streltsov | 361/729 |
| 6,896,612 B1 * | 5/2005 | Novotny | 454/184 |
| 6,927,980 B2 * | 8/2005 | Fukuda et al. | 361/700 |
| D514,102 S * | 1/2006 | Cox et al. | D14/356 |
| 7,099,151 B2 | 8/2006 | Jones et al. | |
| 7,307,834 B2 | 12/2007 | Jones et al. | |
| 7,403,379 B2 * | 7/2008 | Rumney | 361/679.33 |
| 7,436,674 B2 * | 10/2008 | Barsun et al. | 361/727 |
| 7,490,048 B2 | 2/2009 | Joao | |
| 7,529,096 B2 * | 5/2009 | Lin et al. | 361/724 |
| 7,539,020 B2 | 5/2009 | Chow et al. | |
| 7,715,178 B2 * | 5/2010 | Sun et al. | 361/679.02 |
| 7,791,890 B2 | 9/2010 | Ishida | |
| 2003/0007321 A1 * | 1/2003 | Dayley | 361/683 |
| 2003/0030975 A1 * | 2/2003 | Bestwick et al. | 361/683 |
| 2003/0223193 A1 | 12/2003 | Smith et al. | |
| 2004/0100775 A1 * | 5/2004 | Baker et al. | 361/724 |
| 2004/0184242 A1 * | 9/2004 | Jones et al. | 361/724 |
| 2005/0083657 A1 | 4/2005 | Hamman | |
| 2005/0125083 A1 * | 6/2005 | Kiko | 700/19 |
| 2005/0154494 A1 * | 7/2005 | Ahmed | 700/275 |
| 2005/0280986 A1 * | 12/2005 | Coglitore et al. | 361/687 |
| 2006/0042289 A1 | 3/2006 | Campbell et al. | |
| 2006/0118279 A1 | 6/2006 | Stafford | |
| 2006/0238991 A1 * | 10/2006 | Drako | 361/796 |
| 2006/0265449 A1 | 11/2006 | Uemura et al. | |
| 2007/0008691 A1 * | 1/2007 | Kim | 361/683 |
| 2007/0053154 A1 * | 3/2007 | Fukuda et al. | 361/687 |
| 2007/0081308 A1 | 4/2007 | Ishida | |
| 2007/0139883 A1 | 6/2007 | Pinkerton, III et al. | |
| 2007/0177294 A1 * | 8/2007 | Adachi | 360/55 |
| 2007/0247802 A1 * | 10/2007 | Imsand | 361/685 |
| 2008/0029250 A1 | 2/2008 | Carlson et al. | |
| 2008/0049393 A1 * | 2/2008 | Coglitore et al. | 361/687 |
| 2008/0055855 A1 * | 3/2008 | Kamath et al. | 361/700 |
| 2008/0068793 A1 | 3/2008 | Ishimine | |
| 2008/0078542 A1 | 4/2008 | Gering et al. | |
| 2008/0259566 A1 | 10/2008 | Fried | |
| 2008/0285221 A1 * | 11/2008 | Imsand et al. | 361/681 |
| 2010/0049893 A1 * | 2/2010 | Drako | 710/301 |
| 2010/0188816 A1 * | 7/2010 | Bean et al. | 361/696 |
| 2010/0217909 A1 * | 8/2010 | Pavol et al. | 710/301 |
| 2011/0232869 A1 | 9/2011 | Petruzzo | |

FOREIGN PATENT DOCUMENTS

| | | |
|---|---|---|
| WO | 2005088429 A2 | 9/2005 |
| WO | 2010065945 A2 | 6/2010 |

OTHER PUBLICATIONS

Dunlap, Kevin, et al., "The Advantages of Row and Rack-Oriented Cooling Architectures for Data Centers," American Power Conversion, 2006, White Paper #130.

Evans, Tony, "The Different Types of Air Conditioning Equipment for IT Environments," American Power Conversion, 2004, White Paper #59.

Niemann, John, "Hot Aisle vs. Cold Aisle Containment," American Power Conversion, 2008, White Paper #135.

Rasmussen, Neil, "Cooling Strategies for Ultra-High Density Racks and Blade Servers," American Power Conversion, 2006, White Paper #46, Revision 5.

Rasmussen, Neil, et al., "Cooling Strategies for IT Wiring Closets and Small Rooms," American Power Conversion, 2007, White Paper #68.

Rochow, Isabel, "Improved Chilled Water Piping Distribution Methodology for Data Centers," 2006, White Paper #131.

3M, "Fluorochemicals in Heat Transfer Applications", downloaded Dec. 5, 2009.

3M Electronics, "Safe Sustainable Cooling Performance", Apr. 2009.

Cooligy, Emerson Network Power, "Advanced Microstructure Cooling Loop", 2006.

Heger, Monica, "IBM Tests Heating Homes with Data-Center Waste Heat", IEEE Spectrum, downloaded Nov. 26, 2008.

Brown, Eric, "Open Source, Lego-Like Computer Modules Run Linux", http://www.linuxfordevices.com/c/a/News/Open-source-Legolike-computer-modules-run-Linux/, printed on May 10, 2010.

Bug Labs, The BUG, http://www.buglabs.net/products, printed on May 10, 2010.

Espacenet, English Abstract of JP 2006164040, Oct. 12, 2011.

Espacenet, English Abstract of JP 2009032068, Oct. 12, 2011.

Roberts, Mike, "Server Blades: An Emerging Server Architecture", Dell., May 18, 2004.

Slaight, Tom, "Using IPMI Platform Management in Modular Computer Systems," Intel Corporation, Intel Developer Forum, Feb. 18, 2003.

Sun Microsystems, "Sun Blade 8000 and 8000 P Modular Systems, Modular Architecture for Business and Mission Critical Applications and High Performance Computing", Feb. 2008.

Wikipedia, "Blade Server", May 18, 2009.

ZDNet.co.uk, "Blades and Business", Jun. 4, 2007, http://reviews.zdnet.co.uk/hardware/servers/0,1000001735,39287354,00.htm.

* cited by examiner

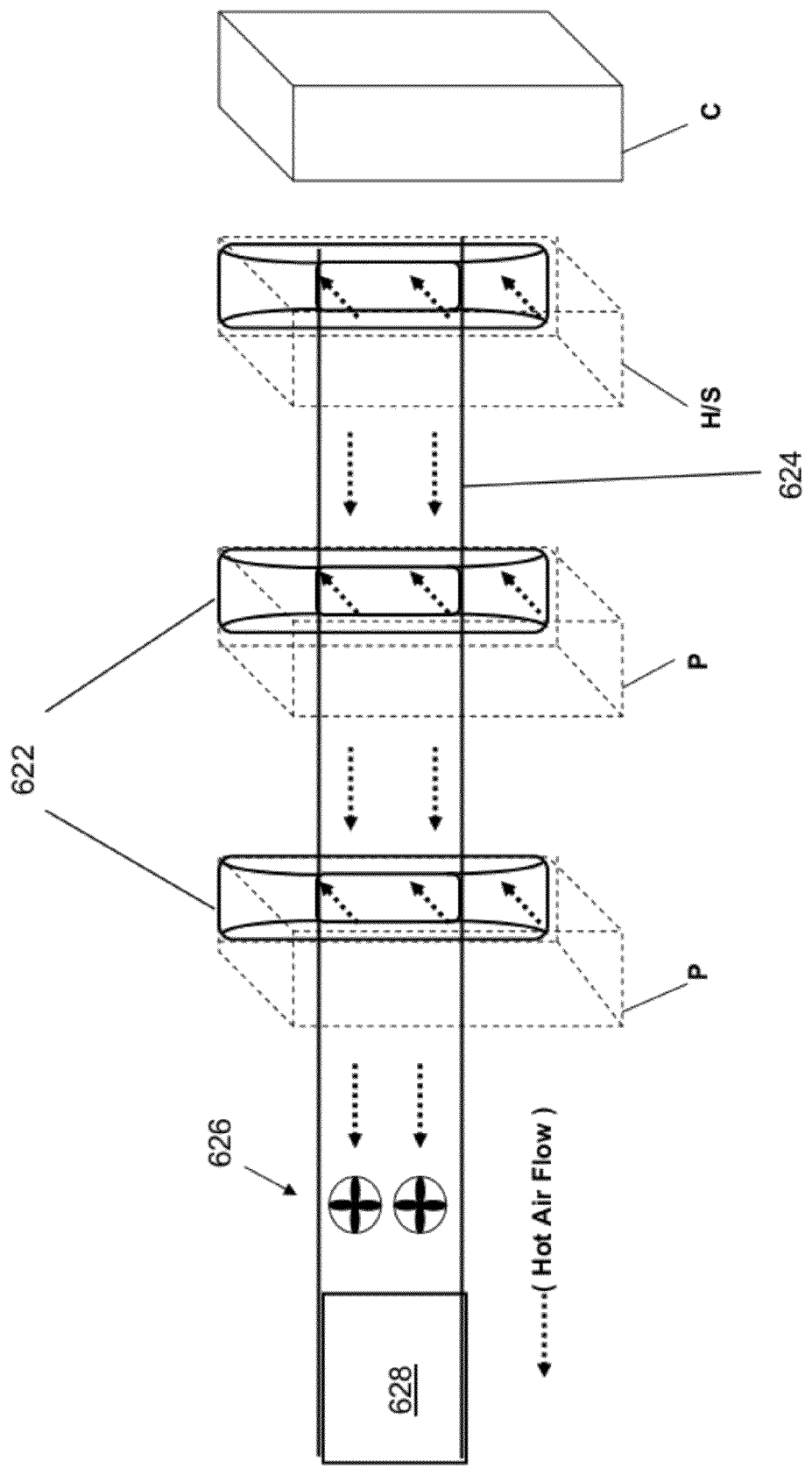

MODULAR RE-CONFIGURABLE COMPUTERS AND STORAGE SYSTEMS

This patent application is a continuation-in-part application of PCT Application No. PCT/US10/37143, filed Jun. 2, 2010, which claims priority to U.S. Provisional Patent Application No. 61/183,426, filed Jun. 2, 2009, which are hereby both incorporated by reference.

I. BACKGROUND OF THE INVENTION

Current methods for building computer servers and storage systems are that these systems are either designed for processing capabilities (e.g., servers, workstations) or storage capabilities (Network Attached Storage (NAS) or Storage Area Networks (SAN)). Their chassis are unique to their capabilities (motherboards, blades or disks) and are not able to accommodate different capabilities without chassis replacement or modification(s). Blade-type servers support additional processing blades within their chassis but can not accommodate storage devices, cooling devices, power devices, etc. in place of a blade. Power supplies are integrated into the chassis in a format that does not allow for interchange of the power supply, storage or cooling fans within the space or format of a processing blade. The current chassis are limited to the number of power supplies, cooling fans, processor boards, and other components based on the design and construction of the chassis such that if a prebuilt space for an additional component is not available, then the chassis itself will need to be replaced or the additional component not used. When the systems are not in use, they will go to a standby or idle mode or even be powered down, but the system will continue to draw power.

More particularly, blade systems use a fixed or "hard" backplane with insertable blades that have a backplane connector that mates up with the backplane connector to provide signal and power connections. The pins on the backplane connector must match with the vendor's pin, voltage and current layout and specifications. Blade chassis do not accept different vendor produced blades. Blades provide processing and memory capabilities but blades are not available for storage, cooling, power, communication to be plugged into a blade chassis backplane connector. Further, blade backplane connectors are vendor specific and do not allow other vendor's blades to be placed into another vendor's blade chassis.

The need for entire chassis replacement adds additional cost, produces waste material requiring disposal and/or recycling, does not allow for incorporation of new technology as it becomes available and does not allow for reconfiguration to add or remove additional processors, storage devices, cooling components, power supplies, or communications/networking components.

II. SUMMARY OF THE INVENTION

In at least one embodiment, the invention includes a modular re-configurable computer and storage system and method of configuring the system. The system includes a chassis having a plurality of slots for blocks that in at least one embodiment include processor blocks, storage blocks, power blocks, communications blocks, cooling blocks, application service blocks such as cloud building blocks, and special-purpose blocks. In a further embodiment, the chassis includes at least one wiring harness with a plurality of connection points for any blocks present in the chassis to facilitate communication, power, and user interaction.

The invention in at least one embodiment includes a method for building a computer system using a chassis having one or more slots for insertion of any type of standardized-sized block with each slot providing interchangeability with other blocks of different functions, the method including selecting an appropriate sized chassis having a plurality of slots for blocks, selecting one or more standardize-sized blocks for performing one or more functions of the computer system, inserting one or more selected blocks into the selected chassis with each block placed in a respective slot irrespective of its type or connections required for the block, and connecting the one or more inserted blocks to at least one of each other or external components.

The invention in at least one embodiment includes a computer system including a chassis having a plurality of slots, at least one block selected from a group including a processor block, a power block, and a storage block, at least one block is installed into any slot of the chassis such that each slot is configured to receive any type of block, and at least one connecting piece connected to the at least one block. In a further embodiment, the connecting piece includes a connector having at least one signal data line and a power line, and the connector has at least one connection point for each slot in the chassis. In an alternative embodiment, the connecting piece includes at least one wiring harness with multiple connectors spaced along it, and multiple pigtail connectors to provide an interface between the connectors along the wiring harness and blocks inserted into the chassis. In a further embodiment, the at least one block further includes a cooling block having at least one fan, an intake air horn extending from the cooling system block, the intake air horn includes a duct connection opening and a second opening sized to fit over the at least one fan, an intake forced air duct extending downstream of a flow of air from the at least one fan, multiple block intake air horns providing an air flow from the intake forced air duct to the other blocks in the computer system, multiple exhaust air horns connected to the other blocks in the computer system to receive air passing through the other blocks, and an exhaust connected to the multiple exhaust air horns.

III. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention. The use of arrow lines in the figures is to show fluid flow through the system device and dash lines are used to show components present on the back side of blocks, for example, FIG. 5B.

Figure 6A:
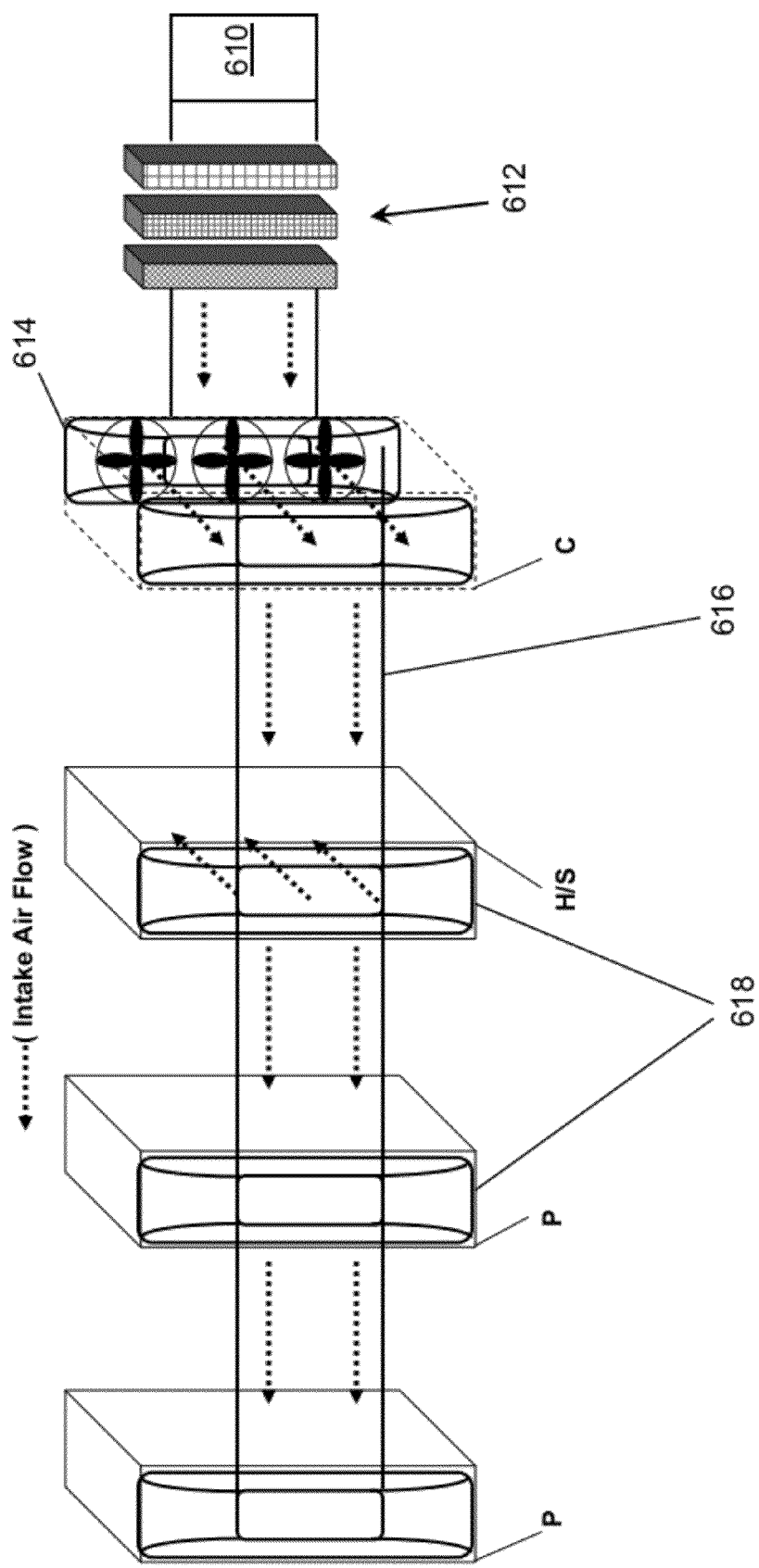

FIGS. 6A-6E illustrate example embodiments of a energy saving cooling structure used to take cooler input air from outside of a building or facility through ducting or conduit, forcing the air through the various blocks with sealed air horns which in turn cools the components inside of the block and moving the hot air through ducts to outside of the facility. FIG. 6A illustrates the intake for the air cooling block, while FIG. 6B illustrates the exhaust for the air cooling block.

Figure 7B:
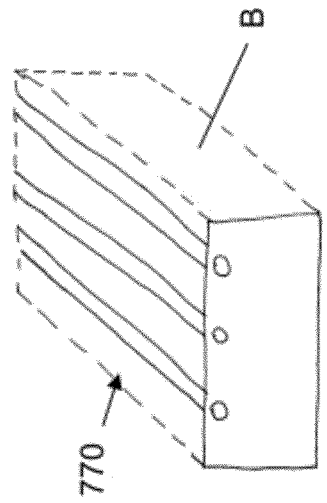
Figure 7A:
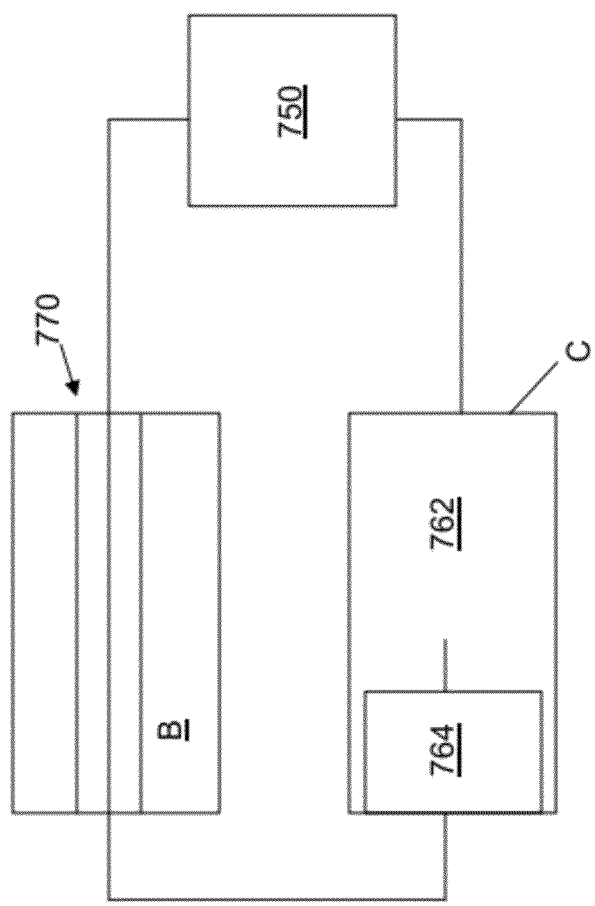

FIGS. 7A and 7B illustrate a further example embodiment of a cooling block structure.

The figures are meant to provide examples of the flexibility provided by the invention and not limitations on the scope of the invention.

IV. DETAILED DESCRIPTION OF THE INVENTION

The invention in at least one embodiment includes a system that provides a structure in which a flexible computer system (s) can be arranged. In at least one embodiment, the system includes a chassis having a plurality of bays (or slots) for receiving at least one building block (or block). In a further embodiment, each bay is uniformly sized to receive any type of appropriately sized building block. In at least one embodiment, the building block is selected from a group including a processing module P, a storage module H or S, a cooling module C, a power module W, a communications module X, a cloud module A, and a special purpose module. In a further embodiment, the chassis includes a wiring harness to connect to any inserted building blocks present in the chassis. In a further embodiment, the system includes a frame that allows for insertion of off-the-shelf components to form a block for insertion into a chassis. The invention allows for flexibility in terms of the number and mixture of building blocks that are present in any one particular system.

The invention in at least one embodiment includes a method of assembly and design of computer systems using the system according to the invention. In further embodiments, the method includes adaption and updating of a previously built system to match current requirements and/or changes in technology. The methods described herein allow one basic chassis to be used to grow, shrink and easily re-configure the system capabilities towards processing, storage, power, cooling and communications without chassis modifications. In at least one embodiment, the blocks are hot swappable allowing capacity and capabilities to be changed on the fly to adjust for demand of resources without turning off power to the system resulting in lower power consumption in at least one embodiment.

Figure 1:
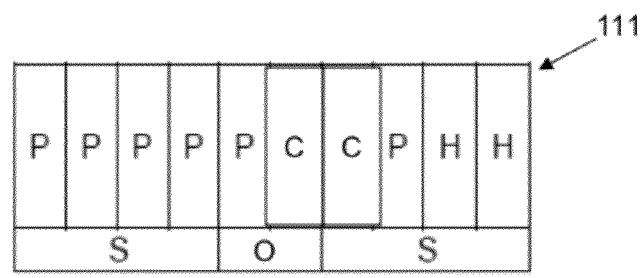
FIG. 1 illustrates an example of a 5U configuration of a chassis with twelve blocks according to the invention.
Figure 2:
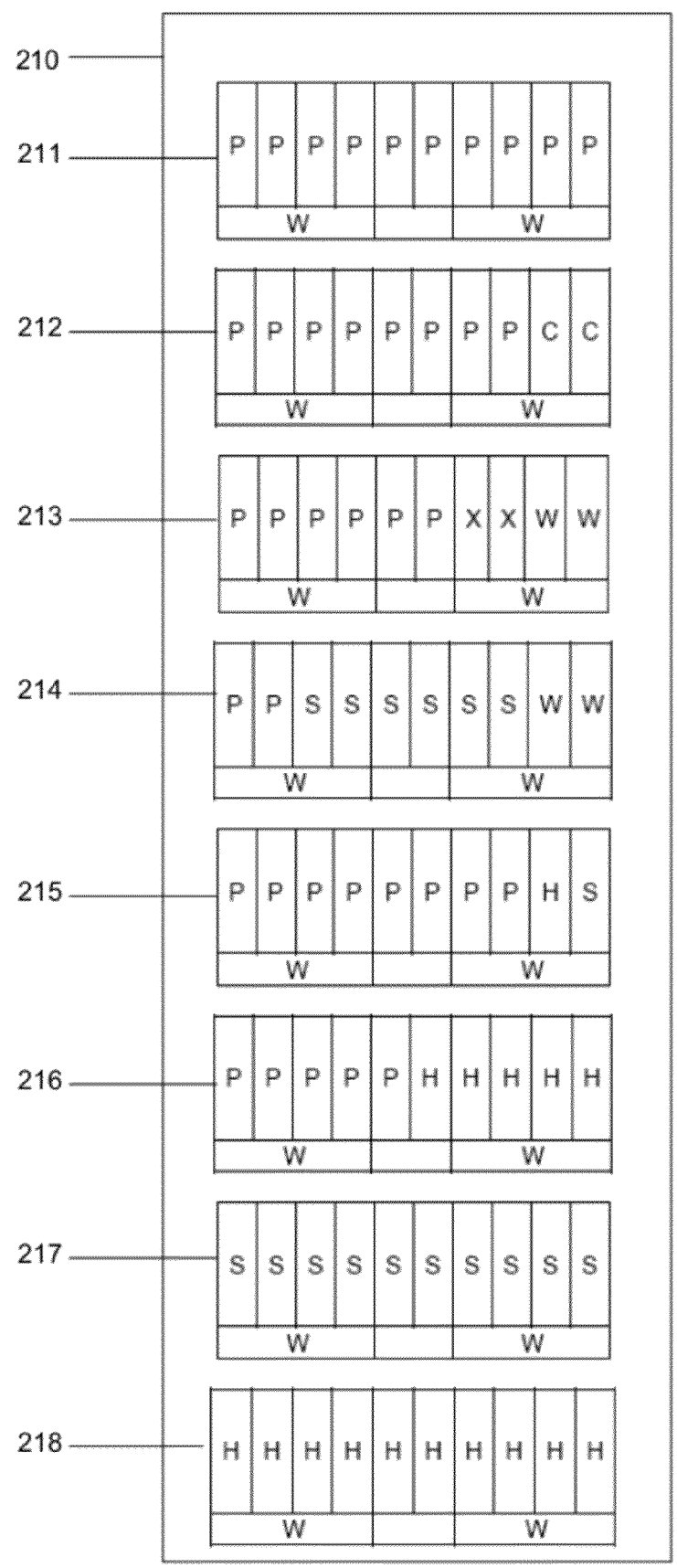
FIG. 2 illustrates a block diagram example of a standard 19 inch rack with multiple chassis each having multiple blocks according to the invention.
Figure 3:
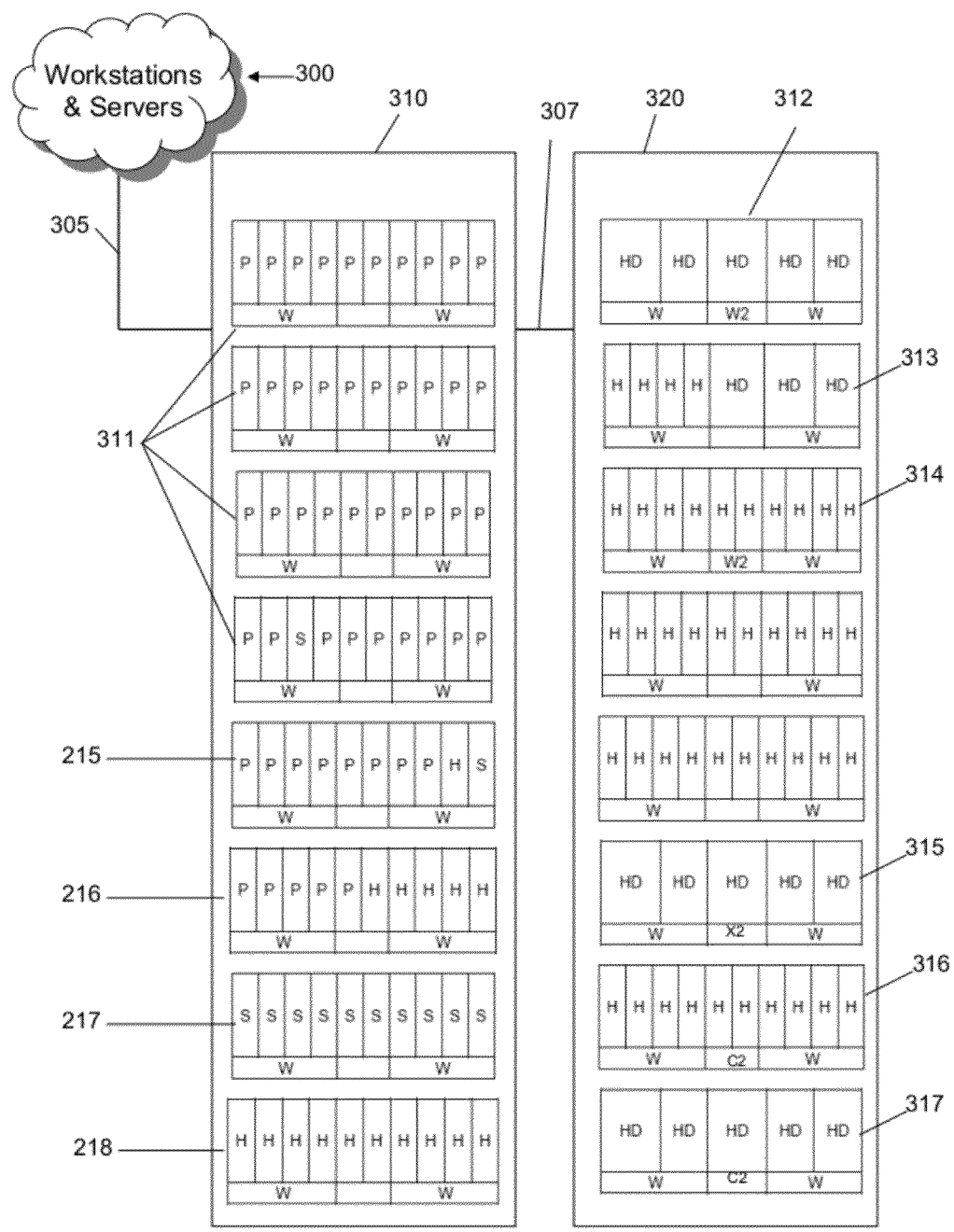
FIG. 3 illustrates a block diagram example of a pair of racks communicating with each other and a network with each rack having multiple chassis, which in turn each have multiple blocks according to the invention. The illustrated racks provide two different examples of chassis mixes in rack systems.

FIGS. 1-3 illustrate examples of implementations built according to the invention that show the flexibility that is possible using the invention. Based on this disclosure it should be appreciated that different building blocks can be inserted into the chassis irrespective of block type. FIG. 1 illustrates a chassis with a twelve building block arrangement, while FIGS. 2 and 3 illustrate industry standard racks having eight chassis per rack with each chassis having ten building blocks. FIG. 1 also illustrates an aspect of at least one embodiment, the slots in the chassis may be orientated vertically or horizontally with the building blocks inserted with the longest dimension running in the direction of orientation or perpendicular to the direction of orientation.

According to the invention, a chassis may have any plurality of slots for receiving blocks. The number of blocks that a chassis may contain and the orientation of the blocks within the chassis may vary. Chassis size should be selected such that it is small enough for manageability for the particular environment but large enough to provide a significant modular unit of processing, storage or anything in-between. One or more spaces for blocks may be left empty in a particular chassis to allow for expansion capability within the chassis. Multiple chassis containing multiple blocks may be stacked together to produce a rack as illustrated, for example, in FIGS. 2 and 3. Further, racks may be combined for continued unlimited scalability as illustrated, for example, in FIG. 3.

Figure 4A:
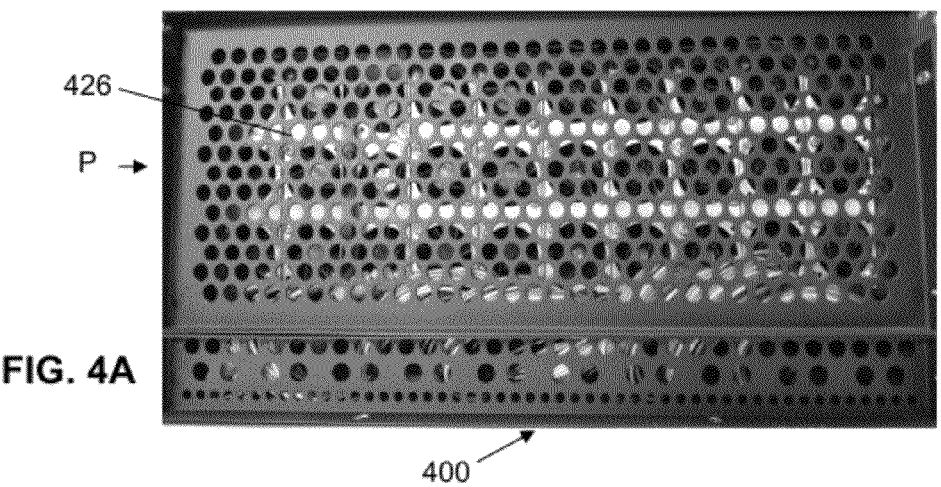
FIGS. 4A and 4B illustrate a front and rear view of a ten slot chassis according to the invention.
Figure 4B:
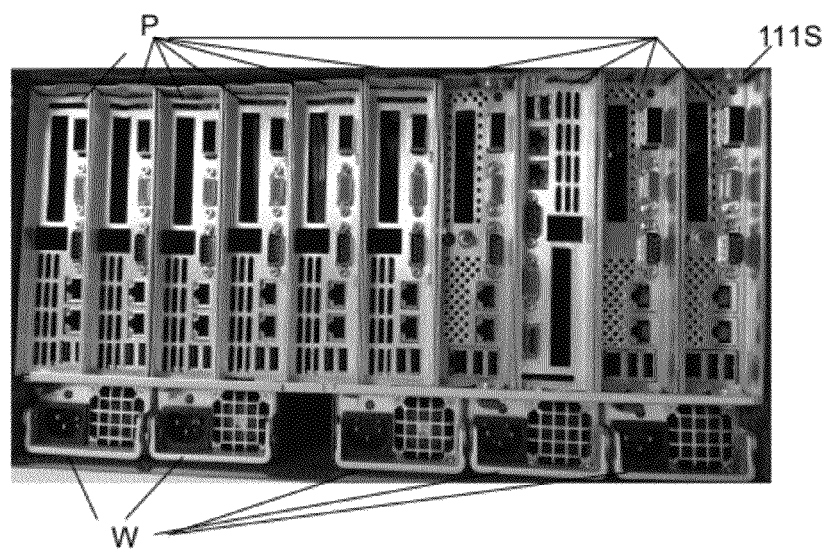

Examples of slots (or bays) for use as part of the chassis include an empty space wide enough to contain a block; an empty space with a screw to retain the block; a channel, track or other structure to stabilize the block, each structure allowing for removal and insertion of one of the various block types. FIGS. 4A and 4B illustrate a chassis 411 that has ten processor blocks P vertically aligned and each held in place with a screw 111S. FIG. 4B also illustrates the presence of 5 power blocks W along the bottom of the chassis.

One example of a chassis configuration is that of a 1U chassis that holds two to four blocks, depending on block size and orientation. These 1U chassis can be stacked within a rack to house 42 chassis, each with four blocks or a total of 168 blocks within a single 19 inch full rack. Two further examples of a chassis configuration for a data center environment are where a 4U chassis contains ten blocks or a 5U chassis that contains twelve blocks may be an optimal configuration based on power, size, weight or other design parameters. A fourth example of a chassis is for mobile applications where the chassis may be designed to contain at least two blocks. In any chassis size selection, the chassis may be stacked and interconnected. Chassis and racks may be combined to provide additional scalability as illustrated, for example, in FIG. 3.

Interconnectivity may be performed in various configurations including block to block, block to chassis, chassis to chassis, block to world, chassis to world, and a combination of any of these configurations. In at least one embodiment, the invention provides enhanced security and manageability due to the ability to have isolated standalone LANs within the system controlled by access permissions. In further embodiments, examples of how interconnectivity is performed include through the external connections of each individual block or chassis, to other blocks or chassis. In a further embodiment, interconnectivity is done via a communication block within the chassis or via a chassis to chassis connection with examples including over Ethernet, Infiniband, Fibre channel, Wireless, XAUI or other interface as the communication is protocol independent.

As discussed above, the chassis do not have designated slots for particular block types, but instead allow the slots present in the chassis to be used for any type of block. The individual blocks in at least one embodiment are connected manually by attachment of, for example, wiring harnesses, cables, wire, and conduit to facilitate the blocks performing their respective functions. An example of this is the wiring harness 500 illustrated in FIG. 5. In another example embodiment, the chassis include harness attachment points to facilitate attachment of cable and the like to particular blocks. These attachment points may provide vendor-specific interfaces on the block side, connected via a vendor-specific "pigtail" connector on one side of the pigtail with the other side of the pigtail terminating in a standardized connector for interface to the standardized wiring harness. This approach allows only the block and pigtail to be vendor specific allowing the rest of the chassis to remain unchanged when switching between the various block types and between vendors. In a further embodiment, the block includes a frame having support structure for connecting to and/or securing an off-the-shelf component(s) and allows the component(s) to be used in the system.

Figure 5:
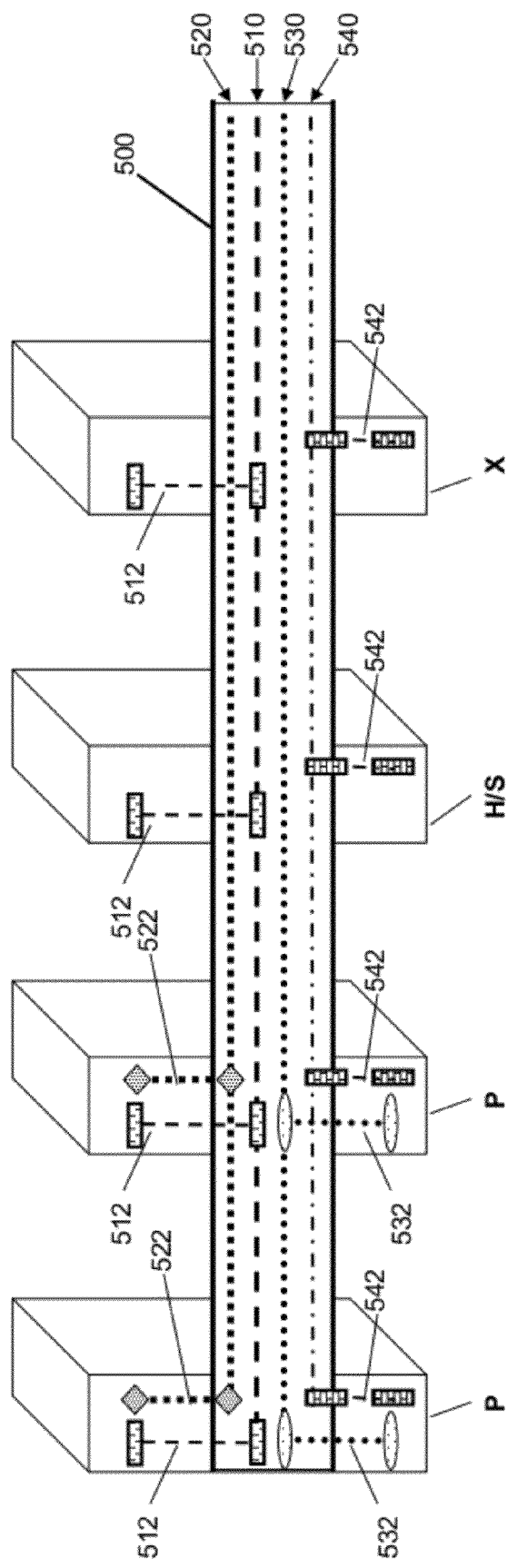
FIG. 5 illustrates an example of a wiring harness with sub-harnesses and vendor specific connectors and pigtails to interface the block with power, communications and various signal data.

FIG. 5 illustrates an example of a main harness (or wiring harness) 500 connecting four blocks (two processor blocks P, one storage block H/S and one communications block X). In FIG. 5, the main harness 500 includes four cables. In the illustrated embodiment, the cables are connected to individual blocks with multiple pigtails: power 510, communications 520, signal 530, and a second communications 550. Although in a further embodiment, the pigtail is integrally formed with the cable and includes an industry standard connector on its free end for connecting to an inserted block.

The power cable(s) 510 includes pigtails 512 for each of the illustrated blocks P, H/S (representative of a storage block being either a hard disk or solid state although other storage components could be used), X. The first communications cable(s) 520 may for example be for Infiniband communication and is illustrated as having its pigtails 522 being connected to just the two processor blocks P. Examples of peripherals that can connect through the illustrated signal cable(s) 530 include a monitor such as VGA, keyboard, mouse, KVM switch, or USB. The signal cable(s) 530 is illustrated as having its pigtails 532 connecting to just the processor blocks P. The second communications cable(s) 540 in the illustrated embodiment has pigtails 542 connecting to all four blocks P, H/S, and X. An example of the second communications cable 540 is an Ethernet cable.

Although FIG. 5 does not illustrate a full complement of the pigtails for each block, in at least one embodiment these unillustrated connectors are present but unconnected to any block through a pigtail in this way the flexibility of the system is maintained if different blocks are used in the chassis in the future. In a further embodiment, at the free end of the wiring harness there are a plurality of connectors for connection to pigtails that connect to, for example, one or more power supplies, an external communications device such as a hub or switch, and one or more peripherals. In a still further embodiment, at the free end of the wiring harness there are a plurality of cables for connecting to, for example, one or more power supplies, an external communications device such as a hub or switch, and one or more peripherals.

In a further embodiment, the wiring harness may consist of one or more wire sub-harnesses. For example, sub-harness may be divided into groups for power, communications, signals, etc. In yet another embodiment, the chassis includes a standard connector or group of connectors that pass power and signal data to one or more blocks where it is up to the block to use, or not use the power or signal conveyed on the connector. The connector would have a connection point for each slot present in the chassis to connect with the block(s) inserted in each slot. An example of this structure is a plug-socket configuration.

FIG. 4A illustrates another example of a wiring harness 400 that includes just power cables. The wiring harness is omitted in FIG. 4B.

In a further embodiment, the wiring harness is routed through a duct, which in some embodiments will reduce electrical interference between components. In a further embodiment that includes cooling components, the wiring harness duct runs adjacent to the duct used for cooling components in the system or alternatively within the same duct while being partitioned from the flow of air.

In another example embodiment, the chassis includes a bus power bar that runs along one border of the slots to provide power through abutment of inserted blocks against the bus. In an alternative embodiment, the bus includes at least one channel running a substantial length of the bus to receive one or more power members extending from the block to provide the electrical connection and power supply to the block. In yet another embodiment, the bus power bar would include spaced outlets along its length for receiving a plug from any block inserted in any corresponding slot to the outlets.

The above examples of connections are examples of connecting pieces (or means for connecting) according to the invention.

Based on the above, one of ordinary skill in the art will appreciate that a standard chassis can be populated with one or more building blocks (blocks) that provide capabilities such as processing, storage, cooling, communications, cloud or other application specific arrangement, or power. A configuration may be slanted towards, for example, processing, storage, communications, or any sliding scale in between, all within the same chassis. For example, a chassis may contain eight processor blocks and two storage blocks. As needs change, the contents of the same chassis may later be re-configured to contain five processor blocks and five storage blocks simply by removing three of the processor blocks and inserting three storage blocks in place of the removed processor blocks. All of the block locations do not need to be used in each chassis. In a further embodiment, if the chassis is outgrown then the blocks can be relocated to a larger chassis by simply moving the blocks from one chassis to another chassis or alternatively linking multiple chassis together. The converse also holds true for downsizing the chassis size.

In at least one embodiment, the invention includes a method that allows for a range of small to large customizable configurations that may share and re-use blocks allowing for easy configuration and re-configuration with minimal effort and without the restraint of any hardwire backplane connectors.

Blocks may be cold-swappable (need to power down the device before removing or inserting) or hot-swappable (do not need to power down the device before removing or inserting).

In the following paragraphs an overview of the different building blocks according to the invention will be provided. The description of the individual blocks is offered as a way of examples and as such this invention is not limited to the described blocks but applies to all blocks housing computer components without limitation.

The block case (or housing) may be fabricated from any material that can withstand the heat and stress generated from operation and movement of the equipment. Material selection varies depending on categories of uses. Examples of material for a lightweight block case include Aluminum, plastics, Titanium, or carbon fiber. When strength is required, examples of material include steel, carbon fiber or Titanium as viable options. If electrical insulation and non-conductivity are required for close fitting components, examples of material include plastic or carbon fiber. If cost is the primary factor, an example of material includes plastics.

Blocks are designed for maximum flexibility and functionality and are discussed later as various block types including, for example, a processor block P (e.g., X86, Cell, and FPGA), a storage block H or S (e.g., hard disk, solid state or other media), a power block W (e.g., AC, DC, Battery, and fuel cell), a cooling block C (e.g., air and liquid), a communications block X (e.g., Ethernet, Infiniband, Fibre, and wireless), a cloud block A, and special-purpose blocks (e.g., sensors, video, and audio).

In at least one embodiment, the blocks have a standard dimension selected to provide uniformity with the chassis having a dimension that accommodates several blocks. The dimensions of both the blocks and the chassis may range in size depending on application needs. However, once the dimensions are selected, all blocks and chassis should conform to these dimensions to allow for interchangeability. For purposes of describing an example embodiment, a standard block size will have the following dimensions: 6.5 inches wide, 1.7 inches high and 20 inches deep. The selected chassis size will be 17.5 inches wide, 8.75 inches high and 22 inches deep. These dimensions allow twelve blocks to be placed within a chassis with ten vertical and two horizontal blocks within the chassis as illustrated, for example, in FIG. 1.

Multiple blocks may be combined as a group to provide additional capabilities. For example, two blocks may be combined to "double up" in the case of hard disks where four disks may fit in a single block with one-half the width of space remaining in the block for another four disks. Such an embodiment is illustrated with storage blocks HD in chassis 312, 313, 315, and 317 in FIG. 3. This remaining space can be reclaimed if combined with another block that also has one-half of the space remaining. In this example, twelve disks will fit inside the combined two blocks (a "double up" block).

Likewise, a "one-half" block may be used in cases where remaining space in a chassis is not large enough to contain an additional block but is large enough to contain one half of a block. Small power supplies, batteries, storage devices, communication components are examples of what can be placed within the "one-half" block to maximize space utilization. An example of an available "one-half" block is illustrated, for example, in FIG. 1 with the space O present between the two horizontal blocks W, W in the bottom center of the chassis. Additional examples of this are power block W2 in chassis 312, 314, communications block X2 in chassis 315, and cooling block C2 in chassis 316, 317 in FIG. 3.

In the illustrated embodiment, a majority of the blocks are stacked with a vertical orientation to reduce stress on any printed circuit board in the up and down direction which is more common than horizontal induced stress. However, in some applications it may be desirable to change orientation to horizontal, especially if more lateral motion will occur in the system.

In at least one embodiment, processor blocks P include one or more of the following processor(s), memory and external interfaces/connectors. The processing power of the processor (s) in most embodiments will exceed GigaFLOPs, and in further embodiment exceeds TeraFLOPs. In at least one embodiment, the memory is measured in multiples of Gigabytes. In at least one embodiment, the external interfaces when combined with connection pieces allow for speeds in excess of multiples of Megabytes per second and in further embodiments Gigabytes per second. Processor blocks P may contain vendor independent motherboards with various types, numbers and speeds of processors, memories including random access memory and caches, and interfaces or other connectors. For example, the motherboard selected to fit inside of the basic block case in one example includes dual quad-core X86 architecture CPUs with 32 Gigabytes of memory, dual Ethernet jacks, an Infiniband connector, one or more fibre connectors, a wireless antenna, and USB and SATA connectors. Whereas another motherboard example includes multiple-cell processors with 64 Gigabytes of memory, one or more USB connectors, an Infiniband connector, one or more Ethernet jacks, and one or more SATA connectors. Still another example of a processor block includes dual Field Programmable Gate Arrays (FPGA), memory and multiple I/O channels.

Processor blocks P may be arranged in a cluster computing configuration, multiple clusters, individual servers, virtualized or in any combination of clusters and servers. The processor blocks may run a single version of operating systems or any combination of any operating system compatible with the processing technology chosen. In a further alternative embodiment, the processor block P is able to operate as a computer independent of a chassis drawing power from a variety of sources.

FIG. 4A illustrates one approach to cooling processor blocks P by including a plurality of fans 426 along one exposed surface. In a further embodiment, the cooling system illustrated, for example, in FIGS. 6A and 6B is overlaid on blocks having their own fans 426 to augment the air flow and in at least one embodiment allowing tuning of the cooling system to provide substantially even flow of air throughout the system to avoid hot/dead air zones.

In at least one embodiment, storage blocks H/S provide memory for storage. Storage blocks H/S may contain vendor independent storage devices with various types, numbers and speeds for storage and retrieval. For example, a storage block H may contain four hard disk drives each of 3 TB yielding 12 TB of storage per storage block. Another example is a double storage block HD, which in at least one embodiment includes twelve hard disk drives that yield 36 TB of storage. Whereas another example storage block S includes 8 solid state cards or disks yielding 5 TB of storage capacity per block. Examples of storage blocks H/S include one or more hard disks such as SATA or SAS; solid state storage such as secure digital (SD), compact flash (CF), and SATA; tape drives; optical or holographic such as compact disk, DVD, or Blu-ray; and other types of storage technologies such as random access memory and flash memory. Storage blocks H/S in different embodiments can be arranged in either dedicated storage such as a Network Attached Storage (NAS) configuration or a Storage Area Network (SAN) configuration for a processor block P or cluster of processor blocks and may be shared with other networks.

In at least one embodiment, power blocks W provide energy for operation of one or more other blocks in the system (although power for a particular system could come from an external power supply). Power blocks W in at least one embodiment provide power to other blocks at predetermined voltages and current loads. The power blocks W, for example, include one or more internal batteries, regulator, power supply and/or smoothing, power rectification and/or conversion, power distribution, or a direct feed from an external feed (e.g., AC or DC from a utility company) although other power components could be present in addition or in place of any of the listed items.

Power blocks W can be arranged to be dedicated to individual blocks or groups of blocks and may be in a redundant or non-redundant configuration. Battery based power blocks W may act as backup power in the event that utility power is lost or allow for portable operation of the system. FIG. 4B illustrates an arrangement with five power blocks W where each power block W provides power to two processor blocks P. In a further embodiment, four power blocks W are pooled together to support the power requirements of the ten processor blocks P leaving the fifth power block W to act as a backup power supply thus providing a redundant power supply if one of the four primary power blocks fails.

In at least one embodiment, power blocks W having one or more batteries will charge the batteries during "off peak hours" when electricity costs are lower, and provide power to the other blocks from the batteries during "peak hours" when electricity costs are higher.

In a further embodiment, the invention includes a method for swapping out power blocks W with batteries to recharge the power block in a different system or at a latter time to extend the runtime on battery power of the system. In this embodiment, the system would include a plurality of power blocks W that would enable operation during the swapping of individual power blocks W.

Cooling blocks C in at least one embodiment provide thermal relief from the heat generated by other blocks. Cooling blocks C in different example embodiments include air cooling components such as fans illustrated, for example, in FIG. 4A; blowers; heat sinks; air ducts illustrated, for example, in FIGS. 6A and 6B; and/or liquid cooling components such as liquid coolants, pumps, reservoirs, heat exchangers, tubing, and couplers illustrated, for example, in FIGS. 7A and 7B. Any tubing and air ducts will (depending on the embodiment) extend from the cooling block to other blocks and/or other external locations in addition to being connected to components located in the cooling block case as illustrated, for example, in FIGS. 6A and 6B. The dashed arrow lines are provided to illustrate the movement of air through the illustrated embodiment with some of the blocks shown in phantom to assist with the illustration of the embodiment that has been split between FIGS. 6A (intake side) and 6B (exhaust side). Both air cooled and liquid cooled cooling blocks C may be used alone in a particular configuration or used in conjunction with each other.

Figures 6C, 6D:
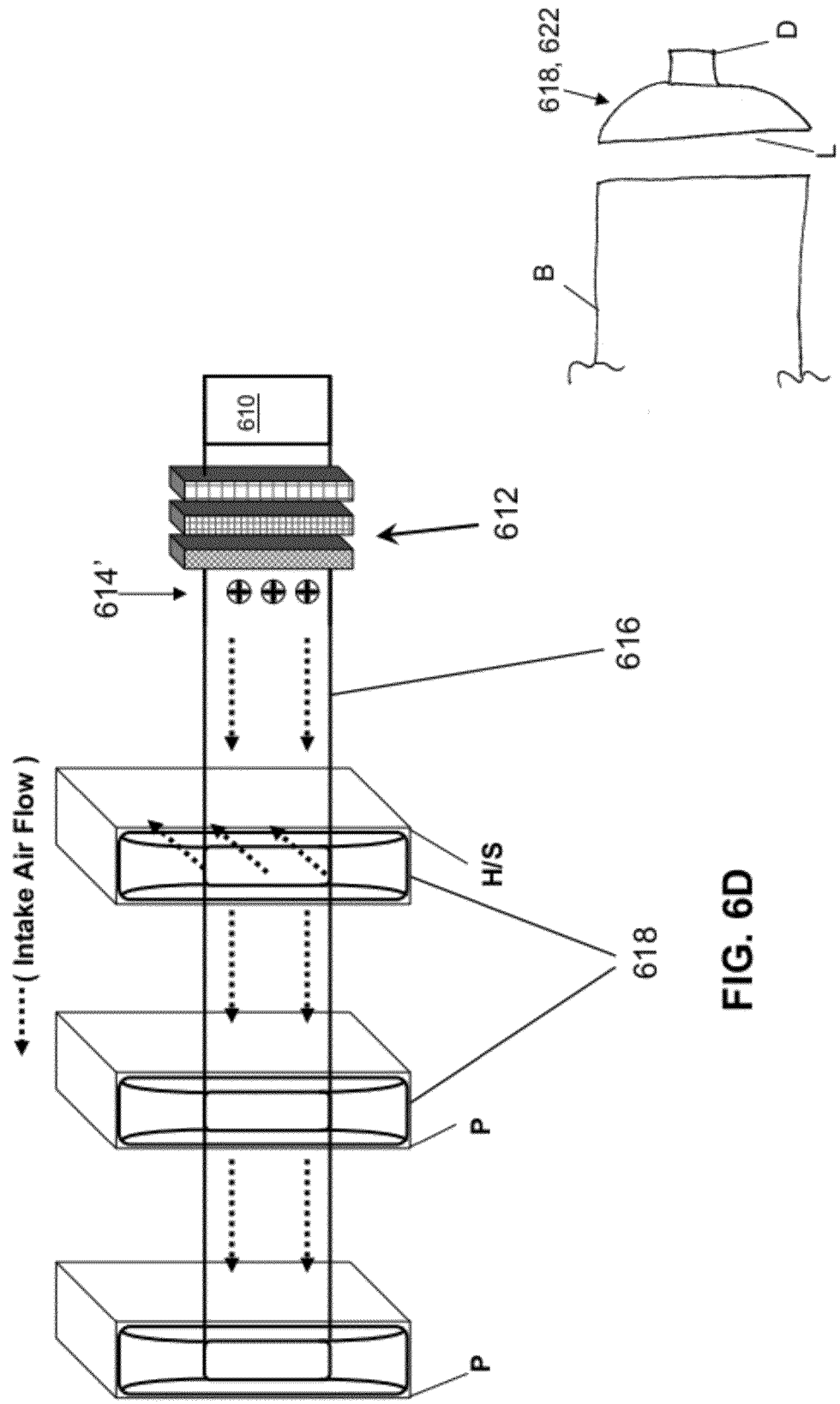

Cooling blocks C in an environmentally friendly embodiment provide "Green" technology benefits. For instance, one embodiment of an air-cooled cooling block C illustrated in FIGS. 6A-6C removes heat from the computer components by taking in cool outside air through an intake 610, filtering and/or cooling the air with a conditioning system 612 such as the illustrated multi-stage air filters and/or chillers, passing through an air horn 613 into the cooling block C for cooling that in at least one embodiment further cools the air passing through it, passing it through one or more ducts 616 or conduits, forcing the air into the various blocks P, H/S (although other blocks may be connected instead of and/or in place of the illustrated blocks) through air horns 618, over the hot components as illustrated in FIG. 6A, and exhausting the hot air to the outside as illustrated in FIG. 6B. The intake 610 in at least one alternative embodiment includes a preliminary filter and/or screen to prevent entry of larger debris into the system. As illustrated in FIG. 6B, the air is drawn (or pushed) into one or more air horns 622 on each block P, H/S into one or more ducts 624 to an exhaust 628. FIG. 6C illustrates a side view of air horn 618, 622 that attaches to the block B along the air horn's long side L and the duct at connector D. In at least one embodiment, the air horn 618, 622 includes a gasket (not illustrated) or similar sealing member to provide a tighter seal and connection to the block B.

In at least one further embodiment, the air is moved through the system with the assistance of fans 614, 626 or other movement inducing components. In a further embodiment, the fans reside in the cooling block C with a cooling block located at the intake and exhaust side of the cooling system. In the illustrated heat extractor cooling block example, the heat moves directly to outside of the facility (or room such as into a false ceiling or additional duct work) avoiding heating the room. By doing so, the load on the facility air conditioner decreases resulting in saving energy costs. In a further embodiment, the exhaust duct includes a damper for routing the heated area to other areas of the facility (e.g., offices and conferences rooms) through additional ducts to provide heating during, for example, the winter thus reducing energy costs. In a further embodiment, the damper is control by a thermostat in a manner similar to running a heating system.

FIG. 6D illustrates an alternative embodiment for cooling that omits the cooling block C from FIG. 6A and in its place includes a master fan(s) 614' to push air through the system. Although the master fan(s) 614' is illustrated as after the conditioning system 612, it alternatively could be located before the conditioning system 612 or on either side of the conditioning system 612. In at least one embodiment, the presence of the master fan(s) 614' reduces the need to run fans on individual blocks B and given the slower rotational speed used of the master fan(s) 614' (when compared to the fans 426 on blocks B), the energy use should decrease along with noise levels.

Figure 6E:
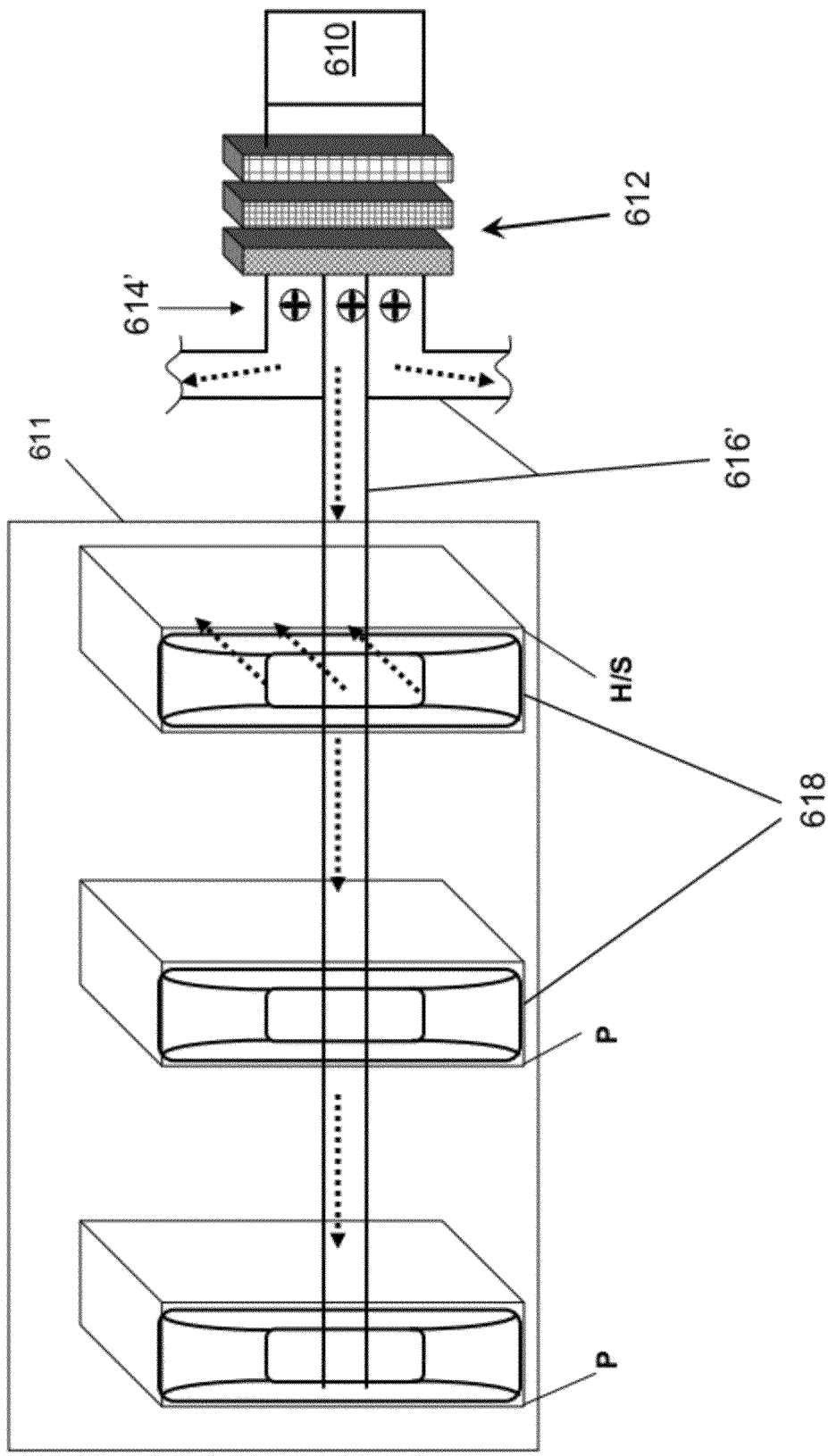

Another embodiment is illustrated in FIG. 6E, which is similar to FIG. 6D. Illustrated in FIG. 6E is the separation of the intake duct into sub-ducts that are directed to individual chassis 611. In a further embodiment, each sub-duct has a dedicated master fan 614' directing air flow into the sub-duct. One advantage for this further embodiment is that if there is no chassis connected to a particular sub-duct, then the master fan associated with that sub-duct can be turned off.

As mentioned previously, the cooling embodiments can be combined with the embodiment where a plurality of fans 426 is located on individual blocks B (e.g., FIG. 4A and processor blocks P). In at least one embodiment, the fans 426 are considered booster fans that are controlled based on temperature sensors present in the block to turn on to increase the air flow when a predetermined temperature threshold is reach by the sensor to provide supplemental cooling beyond the air moved by fans 614, 614'.

In a liquid-cooled cooling block embodiment, the embodiment removes heat from the computer components directly to outside of the facility by pumping a liquid through heat sinks in other blocks B such as on a CPU in the a processor block and other "hot" spots to an outside facility-mounted heat exchanger 750 as illustrated, for example, in FIG. 7A. Some of the cooling components for a cooling block C may reside external to the cooling block C. For example in one embodiment, the cooling block includes liquid-filled heat sinks (illustrated as channels 770 passing through block B in FIGS. 7A and 7B) that are basically cooling caps placed on, for example, CPUs, memory, disks, and power sources, and the cooling block includes a reservoir 762 and an outbound connector to a pump 764, and an external heat exchanger 750 will also be external to the cooling block. The pump 764 may be submerged in the reservoir 762 or external to it, and in an alternative embodiment the pump 764 is external to the cooling block C. In other embodiments, the reservoir, pump, heat exchanger may reside within the cooling block C.

In alternative embodiment, cooling plates such as Peltier cooling plates are added to one or more blocks B to assist with cooling the blocks. In a further embodiment, the cooling plates are use as supplemental cooling and powered when one or more sensors internal to block B exceed a predetermined temperature threshold.

These cooling approaches reduce or eliminate the need for facility air conditioning units when the facility is primarily computer equipment like in a data center.

Communications blocks X in at least one embodiment provide a means for communication to external devices with sufficient throughput to support multiple networks and environments. Communication blocks X in different embodiments may contain vendor independent communications devices with various types, numbers, speeds, connectors and protocols for information transmission. The communications block X in at least one embodiment provides communications to the external network and/or interconnectivity between other blocks and chassis. For example in one embodiment, the communications block includes twelve Ethernet jacks, two Infiniband connectors and two fibre optic connections, whereas another example of a communications block may contain twelve Infiniband connectors and two Ethernet connections. The communications block X in at least one embodiment includes one or more embedded security features such as encryption/decryption, identification, access control, compression, auditing and management, and data backup/recovery.

Application service blocks in at least one embodiment provide service from one or more specific software applications that is measured in transactions per second. For example, an application service block can provide Oracle database transactions, Microsoft Exchange transactions, web server transactions, or indexing and search engine capabilities. The application service block in at least one embodiment generates billing transactions for the services rendered or resources used by the application service block, auditing, usage and performance reports or other application specific information. The application service block in at least one embodiment is a preloaded, pre-configured application layer on top of a physical processor block(s) and/or a storage block (s), a communications block(s) or any combination of these blocks.

An example of an application service block is a cloud block. An example of a cloud block is a processor block with pre-loaded application software to allow creation of a cloud environment within the plurality of blocks within one or more chassis is possible. In at least one embodiment, the cloud block allows for at least one of the following individually or in combination: software as a service (SaaS), platform as a service (PaaS), infrastructure as a service (IaaS), and communication as a service (CaaS). In at least one further embodiment, the cloud block is a double block with a combination of the other building blocks assembled together to provide the desired cloud service(s).

Special-purpose blocks in at least one embodiment provide units that are designed for a particular situation. Examples of these blocks include sensors, video, audio, network monitoring and protection that allow for expansion of the capabilities of the blocks installed in a particular chassis. Examples of sensors include temperature, chemical sniffing and defense, humidity, pressure, wind speed, acceleration, motion, radar, laser, magnetic, light, fire, smoke, and other environmental factors. In at least one embodiment, these blocks in a video and audio configuration include components that extend out from the block to allow for better viewing and/or listening to the information provided by the block.

In a further embodiment according to the invention, the system further includes a rack for installation of one or more chassis into for use. For example, the chassis size may be designed to fit into the standard 19 inch rack data center format, it may be designed to accommodate standard avionics formats for airborne applications, or it may act as a standalone system.

For one example, the standard EIA 19 inch rack format with a 1 Unit (U) measuring 1.75 inches tall is used. Each rack will contain one or more chassis with each chassis containing one or more blocks. One 42U rack would then be able to house various chassis, depending on sizes chosen for the chassis. Examples of block, chassis and rack configuration options are illustrated in FIGS. 2 and 3.

One example uses blocks that measure 6.5 inches wide, by 1.7 inches tall by 20 inches deep. All the illustrated blocks used within the chassis will measure the same dimensions. A twelve block chassis that measures five standard rack-mount units (5U) in height is illustrated, for example, in FIGS. 1-3. The illustrated chassis can be configured to have a variety of blocks including processor blocks P, storage blocks H or S, power blocks W, cooling blocks C, communications blocks X, other block types or special purpose blocks.

The illustrated chassis 111 in FIG. 1 contains ten blocks arranged in a vertical configuration and two blocks arranged in a horizontal configuration. The illustrated 5U chassis 111 measures approximately 8.75 inches tall. In this illustrated embodiment of FIG. 1, the remaining 4.5 inch space between the two horizontal blocks can be reclaimed by use of a "one-half" block or in an alternative embodiment be used for cooling one or more neighboring blocks. An example of this cooling is providing a channel through which air or another fluid can pass through while making contact with one or more neighboring blocks. The illustrated chassis 111 includes eight processor blocks P, two hard disk storage blocks H, and two solid state storage blocks S. The illustrated chassis 111 could be a stand-alone system or incorporated into a rack or other additional housing.

Each chassis can be either a standalone chassis or may be stacked within a rack as illustrated, for example, in FIGS. 2 and 4A. The chassis illustrated in FIG. 2 illustrate some of the variety that is possible for configurations. Each of the illustrated eight chassis 211-218 that are present in the rack 210 include twelve slots with ten vertical slots and two horizontal slots. Each of the chassis 211-218 are illustrated as having two horizontal power blocks W. The top chassis 211 is illustrated as having ten processor blocks P. The next chassis 212 illustrates the combination of eight processor blocks P and two cooling blocks C. The chassis 213 illustrates the combination of six processor blocks P, two communications block X, and two power blocks W such as a group of batteries. The chassis 214 illustrates the combination of two processor blocks P, six solid state storage blocks S, and two power blocks W. The chassis 215 illustrates the combination of eight processor blocks P, one hard drive storage block H, and one solid state storage block S. The chassis 216 illustrates the combination of five processor blocks P and five hard drive storage blocks H. The chassis 217 illustrates a chassis with ten solid state storage blocks S, while chassis 218 illustrates a chassis with ten hard drive storage blocks H. Based on this disclosure, it should be appreciate that these chassis can be rearranged inside rack 210 in addition to different blocks being placed in any of the chassis including leaving slots open.

Multiple racks 310, 320 may be interconnected by a connection 307 as illustrated in FIG. 3. The racks 310, 320 in turn as illustrated can be connected through one or more connections 305 to a network 300. The illustrated network 300 includes a plurality of workstations and servers on, for example, a local area network and/or a wide area network. Examples for the connections 305, 307 include, but are not limited to, GigE, 10 GigE, 40G IBand, and Fibre channel. As with the embodiments illustrated in FIG. 2, each of the chassis in FIG. 3 include two power blocks W (although these slots could be left open or other block types placed there) in addition to ten slots being available for additional blocks.

Each of the illustrated processor blocks P in rack 310 provides 158 GFLOPs, 2x GigE, and 1x 40G IB, and based on this disclosure it will be appreciated that future capabilities of hardware will continue to improve and that the specifications discussed in this example and other examples is for illustrative purposes. For purposes of illustration, rack 310 as illustrated has the capability of 8374 GFLOPs with 192 TB of hard drive storage and 55 TB of solid state storage. The connections to the outside world from rack 310 allow for 106 GiG Ethernet and 2120 Gig IBand. Each of the illustrated chassis 311 with ten processor blocks P that together provide 1580 GFLOPs, 20x GigE, and 10x 40G IB. The chassis 215 provides 1264 GFLOPs, 12 TB hard drive storage, 5 TB solid state storage, 16X GigE, and 8x 40G IB. The chassis 216 provides 790 GFLOPs, 60 TB hard drive storage, 10X GigE, and 5x 40G IB. The chassis 217 provides 50 TB of solid state storage with each solid state storage block S providing 5 TB of storage space. The chassis 218 provides 120 TB of hard drive storage with each hard drive storage block H providing 12 TB of storage space.

In contrast, rack 320 illustrates an embodiment that is capable of providing 1176 TB NAS or SAN with Ethernet, Infiniband, SAS, Fibre connectivity and redundant input/output paths. Between the eight chassis in rack 320 there are 62 hard drive storage blocks H and HD totaling 1176 GB as illustrated. As mentioned earlier in this disclosure, chassis 312-317 illustrate different combination of half-blocks (e.g., W2, X2, C2), regular blocks (e.g., H, W), and double blocks (e.g., HD).

The invention also includes one or more methods for configuring/building and reconfiguring a system for a particular purpose. The method in at least one embodiment includes selecting the appropriate sized chassis for the functionality that is anticipated being required. The method also includes preparing specifications for the functionality required for the system being built including selection of block case material and selection of blocks. After the selections are made, loading the selected blocks into the chassis and connecting the blocks as needed. In a further embodiment, the blocks are selected from a group including, for example, processor block, storage block, power block, cloud block, and communications block. In a still further embodiment, the group further includes at least one of application service blocks and special-purpose blocks.

The method in a further embodiment includes at a later time determining that a reconfiguration of the system is desired, needed, or required. Determining the mix of blocks needed for the system after reconfiguration. Removing any of the currently installed blocks not required for the reconfiguration, and installing any new blocks into the chassis irrespective of what type of block may have been present in a particular slot of the chassis.

In a further embodiment, the method includes scaling the process up to multiple chassis and one or more racks depending upon the requirements for a particular system.

Initial configuration for a chassis in at least one embodiment is as a high performance computing cluster, some individual servers, shared storage pools, or dedicated storage pools. After a period of time, it is desired to expand the high performance computing capabilities of the chassis and the installed blocks. If expansion room exists in the current chassis, adding processor blocks, otherwise adding a chassis and processor blocks.

In at least one embodiment, if it is desired to increase the storage capacity, then if expansion room exists in the current chassis, add storage blocks, otherwise add a chassis and storage blocks.

In at least one embodiment, if it is desired to change to solid state storage for speed and lightweight, then remove the hard disk storage blocks, and replace them with solid state storage blocks.

In at least one embodiment, if there is a desire to change over systems to liquid cooling to save energy, then remove heat sinks and fans to add a liquid cooling block and tubing, etc.

In at least one embodiment, if the user wants to add battery and/or solar power, then a power block containing at least one battery and/or solar cells is added.

In at least one embodiment, if there is a desire to have a technology refresh, then remove the old blocks that are not desired and replace them with new blocks.

In at least one embodiment, if there is a desire to separate the data into smaller data processing racks, then remove the processor blocks and the storage blocks. Divide the open blocks among new chassis, insert the blocks in new chassis to create a distributed storage configuration.

In at least one embodiment, if there is a desire to add disaster recovery backup facility, then at the remote facility, add chassis, processor blocks and storage blocks. After setup, then mirror storage blocks.

In at least one embodiment, if there is a desire to convert systems to be mobile, then remove processor blocks and storage blocks, insert the removed blocks into a smaller chassis while leaving room for a wireless communications capability.

The use of dimensions in the above disclosure is done with the recognition of manufacturing tolerances for components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements (if any) in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

Although the present invention has been described in terms of particular example embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the preferred and alternative embodiments described above can be configured without departing from the scope and spirit of the invention. Therefore, it is to be understood that, within the scope of the appended claims, the invention may be practiced other than as specifically described herein.

The invention claimed is:

1. A computer system comprising:
a chassis having a plurality of slots,
at least one block selected from a group including a processor block, a power block, and a storage block, at least two blocks are installed into any two slots of said chassis such that each slot is configured to receive any type of block, and
at least one connecting piece connected to said at least two blocks; and
wherein said at least one block includes a cooling system block having
at least one fan,
an intake air horn extending from said cooling system block, said intake air horn includes a duct connection opening and a second opening sized to fit over said at least one fan,
an intake forced air duct extending downstream of a flow of air from said at least one fan,
multiple block intake air horns providing an air flow from said intake forced air duct to said other blocks in said computer system,
multiple exhaust air horns connected to said other blocks in said computer system to receive air passing through said other blocks, and
an exhaust connected to said multiple exhaust air horns.

2. A computer system comprising:
a chassis having a plurality of slots,
at least one block selected from a group including a processor block, a power block, and a storage block, at least two blocks are installed into any two slots of said chassis such that each slot is configured to receive any type of block,
at least one connecting piece connected to said at least two blocks, and
a cooling system having
an intake,
at least one filter in said intake,
at least one fan in said intake,
an intake forced air duct extending downstream of a flow of air from said at least one fan,
multiple block intake air horns providing an air flow from said intake forced air duct to said other blocks in said computer system,
multiple exhaust air horns connected to said other blocks in said computer system to receive air passing through said other blocks, and
an exhaust connected to said multiple exhaust air horns.

3. The computer system according to claim 2, wherein in said exhaust includes a damper controlled by a thermostat, said damper routes the exhaust through a duct to the outside or a duct routed to another building area.

4. The computer system according to claim 1, wherein said at least one connecting piece includes
at least one wiring harness with multiple connectors spaced along it, and
multiple pigtail connectors to provide an interface between the connectors along said wiring harness and blocks inserted into said chassis.

5. The computer system according to claim 4, wherein each pigtail connector includes a connection for at least one signal data line and at least one power line, at least one connection point
for each slot in said chassis, there is at least one pigtail connector.

6. The computer system according to claim 4, wherein said connecting piece includes a bus power bar.

7. The computer system according to claim 4 further comprising at least one block selected from a group consisting of a processor block, a power block, a storage block, a communications block, an application service block, and a special-purpose block.

8. The computer system according to claim 7, wherein said special-purpose block includes at least one of a sensor, a video component, and an audio component.

9. The computer system according to claim 8, wherein said sensor is selected from a group consisting of temperature, chemical, humidity, pressure, wind speed, acceleration, motion, light, fire, smoke, radar, laser, and magnetic.

10. The computer system according to claim 4, wherein each of said pigtail connector includes a standardized connector for connecting to said at least one connecting piece and a vendor specific connector matching the inserted block.

11. The computer system according to claim 5, wherein each of said pigtail connector includes a standardized connector for connecting to said at least one connecting piece and a vendor specific connector matching the inserted block.

12. The computer system according to claim 6, wherein said bus power bar configured to provide power to inserted blocks abutting against said bus power bar.

13. The computer system according to claim 8, wherein said sensor is selected from a group consisting of temperature, chemical, humidity, pressure, wind speed, acceleration, motion, light, fire, and smoke, said sensor is for monitoring environmental factors external to said chassis.

14. The computer system according to claim 4, wherein said at least one block includes at least one application service block.

15. The computer system according to claim 2, wherein said at least one connecting piece includes
at least one wiring harness with multiple connectors spaced along it, and
multiple pigtail connectors to provide an interface between the connectors along said wiring harness and blocks inserted into said chassis.

16. The computer system according to claim 15, wherein each pigtail connector includes a connection for at least one signal data line and at least one power line, at least one connection point
for each slot in said chassis, there is at least one pigtail connector.

17. The computer system according to claim 15, wherein each of said pigtail connector includes a standardized connector for connecting to said at least one connecting piece and a vendor specific connector matching the inserted block.

18. The computer system according to claim 15, wherein said connecting piece includes a bus power bar.

19. The computer system according to claim 15 further comprising at least one block selected from a group consisting of a processor block, a power block, a storage block, a communications block, an application service block, and a special-purpose block; and wherein said special-purpose block includes at least one of a sensor, a video component, and an audio component, and said sensor is selected from a group consisting of temperature, chemical, humidity, pressure, wind speed, acceleration, motion, light, fire, smoke, radar, laser, and magnetic.

20. The computer system according to claim 15 further comprising at least one block selected from a group consisting of a processor block, a power block, a storage block, a communications block, an application service block, and a special-purpose block.

* * * * *